US011994689B2

(12) United States Patent
Nguyen

(10) Patent No.: US 11,994,689 B2
(45) Date of Patent: May 28, 2024

(54) DIFFRACTIVE OPTICAL ELEMENTS FOR LARGE-FIELD IMAGE DISPLAY

(71) Applicant: GOOGLE LLC, Mountain View, CA (US)

(72) Inventor: Khoa Nguyen, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 818 days.

(21) Appl. No.: 15/733,635

(22) PCT Filed: Oct. 18, 2019

(86) PCT No.: PCT/US2019/056928
§ 371 (c)(1),
(2) Date: Sep. 22, 2020

(87) PCT Pub. No.: WO2021/076148
PCT Pub. Date: Apr. 22, 2021

(65) Prior Publication Data
US 2021/0325688 A1    Oct. 21, 2021

(51) Int. Cl.
*G02B 27/42* (2006.01)
*G02B 5/18* (2006.01)
*G02B 27/10* (2006.01)

(52) U.S. Cl.
CPC ....... *G02B 27/4272* (2013.01); *G02B 5/1823* (2013.01); *G02B 27/10* (2013.01); *G02B 27/4205* (2013.01)

(58) Field of Classification Search
CPC .. G02B 27/4272; G02B 5/1823; G02B 27/10; G02B 27/4205

(Continued)

(56) References Cited

U.S. PATENT DOCUMENTS 8,564,866 B2    10/2013    Kitamura et al.
9,442,291 B1    9/2016    Martinez et al.
(Continued)

FOREIGN PATENT DOCUMENTS

CA    3016413 A1    9/2017
CN    107003785 A    8/2017
(Continued)

OTHER PUBLICATIONS

International Search Report and Written Opinion for PCT Application No. PCT/US2019/056928, dated Sep. 8, 2020, 19 pages.

*Primary Examiner* — Sharrief I Broome
(74) *Attorney, Agent, or Firm* — Brake Hughes Bellermann LLP

(57) ABSTRACT

Techniques of generating a wavefront modulating element (WME) for imaging an object over a large image field include (i) designing a WME by breaking a large image into smaller sub-images and then applying an inverse imaging operation to find a segment of a plurality of segments (324-1 to-334-n) of a WME (in the from of DOE) producing a sub-image, and (ii) specifying an optical system to illuminate the WME resulting from each of the plurality of segments in such a way that the large image is reproduced as closely as possible. Along these lines, given a large target image in the far-field, a WME generation system decomposes the target image into sub-images. From this decomposition, the WME generation system then produces WME segments corresponding to the sub-images. The WME segments are then arranged in an optical system such that abeam of electromagnetic radiation (316) is reproduced into sub-beams that are normally incident on the WME segments (for example by gratings 332 diffracting light towards a DOE and back into a lightguide 320).

20 Claims, 8 Drawing Sheets

(58) Field of Classification Search
USPC .................................. 359/576, 580, 572, 573
See application file for complete search history.

(56) References Cited

U.S. PATENT DOCUMENTS

| | | | |
|---|---|---|---|
| 9,778,476 | B2 | 10/2017 | Hazeghi et al. |
| 9,959,818 | B2 | 5/2018 | Bohn |
| 10,948,647 | B2 | 3/2021 | Fattal |
| 11,022,801 | B2 | 6/2021 | Klug et al. |
| 11,125,880 | B2 | 9/2021 | Send et al. |
| 11,435,572 | B2 | 9/2022 | Yeoh et al. |
| 2007/0057211 | A1 | 3/2007 | Bahlman et al. |
| 2009/0285076 | A1 | 11/2009 | Rothenberg |
| 2011/0188054 | A1 | 8/2011 | Petronius et al. |
| 2012/0223218 | A1* | 9/2012 | Miyasaka ........... G02B 27/0944 |
| | | | 359/558 |
| 2016/0147003 | A1* | 5/2016 | Morozov ............... G02B 27/10 |
| | | | 362/613 |
| 2016/0223828 | A1* | 8/2016 | Abraham ................ G01C 3/02 |
| 2016/0234485 | A1 | 8/2016 | Robbins et al. |
| 2016/0378062 | A1 | 12/2016 | Watanabe et al. |
| 2017/0160547 | A1* | 6/2017 | Webster ............. G02B 27/4205 |
| 2017/0212471 | A1* | 7/2017 | Ogasawara .......... G03H 1/0406 |
| 2017/0371090 | A1* | 12/2017 | Fattal .................... H04N 13/302 |
| 2018/0232048 | A1* | 8/2018 | Popovich ............... G02B 6/105 |
| 2018/0329365 | A1 | 11/2018 | Zhang et al. |
| 2019/0219822 | A1* | 7/2019 | Popovich ........... G02B 27/0103 |
| 2019/0285899 | A1 | 9/2019 | Levola et al. |
| 2020/0073030 | A1* | 3/2020 | Toyama ............... G02B 5/1866 |
| 2020/0326546 | A1 | 10/2020 | Edwin et al. |
| 2021/0325688 | A1 | 10/2021 | Nguyen |
| 2022/0091320 | A1 | 3/2022 | Danziger |

FOREIGN PATENT DOCUMENTS

| | | | | |
|---|---|---|---|---|
| CN | 107209415 | A | 9/2017 | |
| CN | 107250887 | A | 10/2017 | |
| CN | 108152949 | A | 6/2018 | |
| CN | 108351527 | A | 7/2018 | |
| CN | 108646331 | A | 10/2018 | |
| CN | 109716206 | A | 5/2019 | |
| CN | 110168419 | A | 8/2019 | |
| JP | 2004348890 | A | 12/2004 | |
| JP | 2006047553 | A | 2/2006 | |
| JP | 2006091041 | A | 4/2006 | |
| JP | 2008083658 | A | 4/2008 | |
| JP | 2008197246 | A | 8/2008 | |
| JP | 2010060605 | A | 3/2010 | |
| JP | 2012194543 | A | 10/2012 | |
| JP | 2014231171 | A | 12/2014 | |
| JP | 2015184288 | A | 10/2015 | |
| JP | 2017129769 | A | 7/2017 | |
| KR | 20190086763 | A | 7/2019 | |
| KR | 20190115404 | A | 10/2019 | |
| WO | 2011074209 | A1 | 6/2011 | |
| WO | 2016063319 | A1 | 4/2016 | |
| WO | 2016118107 | A1 | 7/2016 | |
| WO | WO-2016118107 | A1 * | 7/2016 | ........... G02B 27/425 |
| WO | 2016146903 | A1 | 9/2016 | |
| WO | WO-2016146903 | A1 * | 9/2016 | ......... G02B 27/0103 |
| WO | 2017164871 | A1 | 9/2017 | |
| WO | WO-2017164871 | A1 * | 9/2017 | ........... G02B 27/225 |
| WO | 2019124106 | A1 | 6/2019 | |

\* cited by examiner

DIFFRACTIVE OPTICAL ELEMENTS FOR LARGE-FIELD IMAGE DISPLAY

CROSS REFERENCE TO RELATED APPLICATION

This application is a 35 U.S.C. § 371 National Phase Entry Application from PCT/US2019/056928, filed Oct. 18, 2019, designating the U.S., the disclosure of which is incorporated herein by reference in its entirety.

TECHNICAL FIELD

This description relates to designing diffractive optical elements (DOEs) for WMEs over large fields.

BACKGROUND

Some imaging systems use a diffractive optical element (DOE) to form an image of an object. A laser or other coherent source of electromagnetic radiation forms an electric field at an input plane of the DOE. The DOE then applies a transmission function to the electric field, such that the radiation emanating from the DOE produces an image intensity at an image plane. When the image plane either coincides with a focal plane (e.g., when the electric field has spherical wavefronts) or is sufficiently far from the DOE (e.g., when the electric field has plane wavefronts), then the image intensity is related to the transmission function of the DOE via a Fourier transform of the transmission function of the DOE.

SUMMARY

In one general aspect, a method can include generating a wavefront modulating element (WME) based on a first image, the WME including a plurality of WME segments, each of the plurality of WME segments corresponding with a respective portion of the first image. The method can also include generating, by an illumination system, a beam of electromagnetic radiation. The method can further include performing a beam duplication operation on the beam of electromagnetic radiation to illuminate each of the plurality of WME segments with the beam of electromagnetic radiation at a specified angle of incidence, the plurality of WME segments forming the WME and producing upon illumination a second image, a difference between the first image and the second image being less than a specified threshold.

In another general aspect, a computer program product comprising a non-transitory storage medium, the computer program product including code that, when executed by processing circuitry of a computing device, causes the processing circuitry to perform a method. The method can include receiving intensity data representing a first image. The method can also include performing an image decomposition operation to produce a plurality of sub-images of the first image, each of the plurality of sub-images representing a portion of the image. The method can further include, for each of the plurality of sub-images of the image, performing an inverse imaging operation on that sub-image to produce a wavefront modulating element (WME) segment of a plurality of WME segments, each of the plurality of WME segments corresponding to a respective sub-image of the plurality of sub-images. The method can further include arranging the plurality of WME segments based on the image decomposition operation to form a WME.

The details of one or more implementations are set forth in the accompanying drawings and the description below. Other features will be apparent from the description and drawings, and from the claims.

DETAILED DESCRIPTION

Figure 1:
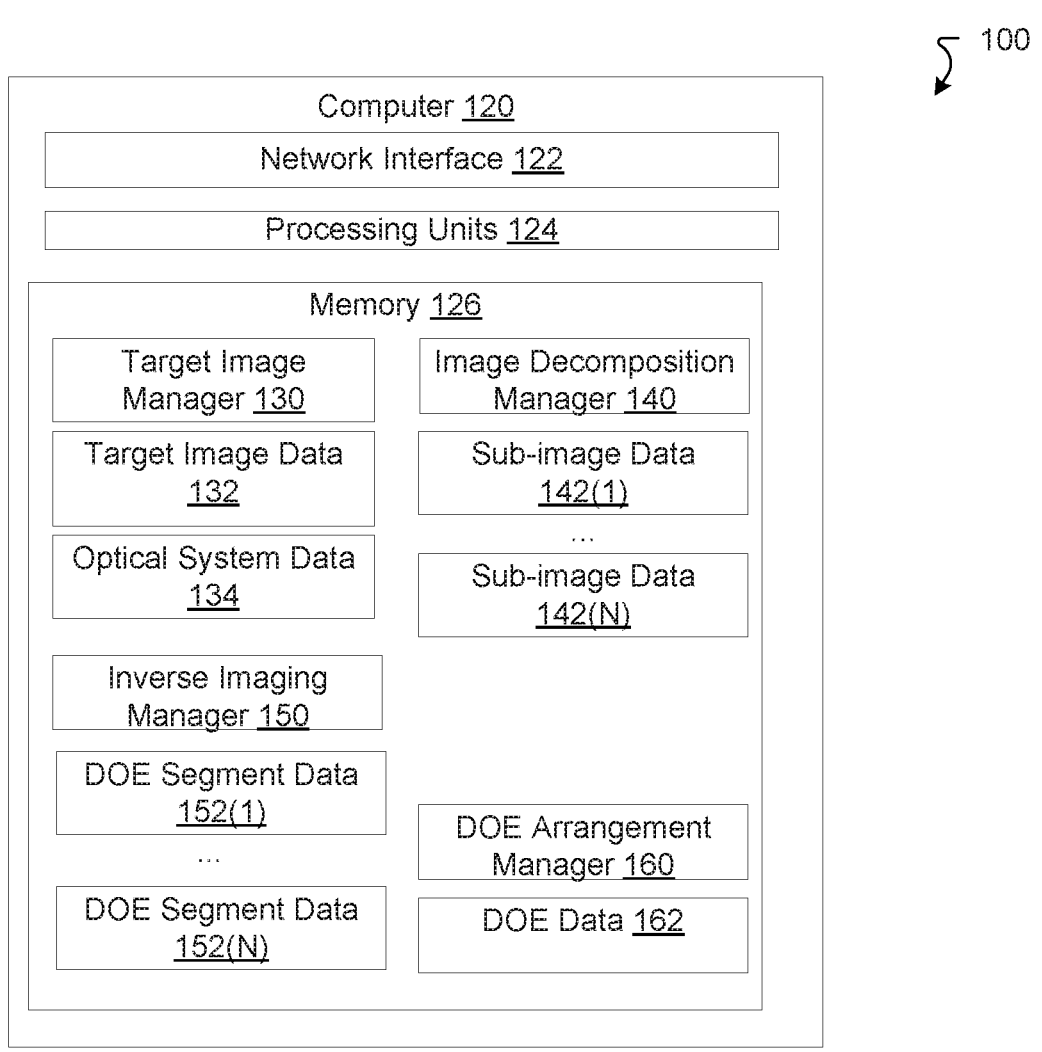
FIG. 1 is a diagram that illustrates an example electronic environment in which improved techniques described herein may be implemented.

Many DOE's are manufactured using a pattern transfer technology such as optical lithography. For example, when the transmission function is a phase function, then the DOE may take the form of a smooth curve of glass in which the height of glass is proportional to a phase value. Practically, the smooth curve is approximated by pixels and there are only a very small number of phase values (typically two or four); the DOE then includes small stacks or divots of glass, each of which has one of the two or four prescribed heights or depths, e.g., corresponding to (0, 180) degrees for two-step, or (0, 90, 180, 270) degrees for four-step.

In some imaging applications such as facial recognition, the image intensity in the image plane is specified and it is desired to deduce the makeup of a DOE that produces the specified image intensity. When the image plane is in the far-field, then conventional approaches to determining the transmission function of a DOE use an Iterative Fourier Transform Algorithm (ITFA) to deduce the phase of the transmission function from the specified image intensity. Because many such phases may produce the specified image intensity, the IFTA applies constraints at each transform step to produce a transmission function that satisfies those constraints. For the case in which the DOE needs to be manufactured, the constraints involve the transmission function being a phase function such that the phase takes on one of the two or four prescribed values.

A technical problem in using the IFTA to determine the transmission function of a DOE that produces a specified intensity in an image plane is that the conventional approaches to imaging an object described above are poorly suited to images over larger image fields. For example, the IFTA assumes that the angles of propagation of electric field wavefronts between the DOE and the image plane are smaller than a threshold (e.g., less than 20 degrees). Larger image fields may use wavefronts with propagation angles significantly larger than the threshold. Moreover, even when the IFTA is combined with a more accurate image model valid for angles larger than the threshold, the resulting DOE may not be manufacturable.

A DOE is one example of wavefront modulating elements (WMEs) that are used to produce a wavefront in an object or pupil plane that generates a specified image in an image or far-field plane. Other WMEs include spatial light modulators, deformable mirrors, adaptive optics, and the like.

In accordance with the implementations described herein, a technical solution to the above-described technical problem of generating a WME for imaging an object over a large image field includes (i) designing a WME by breaking a large image into smaller sub-images and then applying IFTA to find a segment of a plurality of segments of a WME producing a sub-image, and (ii) specifying an optical system to illuminate the WME resulting from each of the plurality of segments in such a way that the large image is reproduced as closely as possible. Along these lines, given a large target image in the far-field, a WME generation system decomposes the target image into sub-images. From this decomposition, the WME generation system then produces WME segments corresponding to the sub-images. The size of the sub-image and corresponding WME segment is defined such that, upon illumination of the WME segment at normal incidence, the maximum angle of image rays in the vicinity of the far-field (i.e., image) plane is below a threshold angle (e.g., 10 degrees). The WME segments are then arranged in an optical system such that a beam of electromagnetic radiation is reproduced into sub-beams that are incident on the WME segments at the same angle (e.g., normally incident). An aggregation of the images produced by the WME segments produces an aggregate image which differs from the target image by less than a specified threshold (e.g., 5%).

A technical advantage of the above-described technical solution is its ability to produce accurate results using a simple inverse imaging model such as the IFTA, as well as a simple optical assembly to realize those accurate results. By assembling such an optical system, it is easier to generate WMEs that produce images having a close agreement with those images predicted in the simple models. Because the design of the WMEs is based on a simple, paraxial wave optics model, the design process is greatly simplified because, in contrast to image models accurate for large angles, most algorithms are based on Fourier transforms. By breaking the problem of designing a WME for a large image field into smaller WMEs over small image fields, the design of the WME segments may be carried out even more rapidly in parallel. Accordingly, the above-described technical solution provides an infrastructure for a rapid design and deployment of masks for accurate reproduction of a specified image.

An optical system used to perform the imaging is configured to illuminate each WME segment at a specified angle of incidence. In some implementations, the optical system is configured to illuminate the WME segments at normal incidence. A conventional optical system may produce such illumination using as many illumination sources (e.g., diode lasers) as there are WME segments. Such an optical system, however, is complex and costly. Accordingly, an improved optical system converts a beam of radiation into as many beams as needed, as the specified angle of incidence on each WME segment. In some implementations, and as is shown with regard to FIGS. 3A, 3B, 5A, and 5B in which the WME is a DOE, the improved optical system includes a light guide and a monolithic diffractive stack, including a diffraction grating embedded in a wall of the light guide to direct radiation to DOE segments at the specified angle of incidence.

As an example, consider a telepresence application that maps a depth image of a person within a small room. (A depth image of a person is a map of the person's shape in the space of the room.) While multiple depth sensors may be used to detect the depth image, system cost can be vastly reduced by minimizing the number of depth sensors. Nevertheless, when there are few depth sensors, each depth sensor may have to cover a large image field. Accordingly, the above-described technical solution allows for the use of a minimum number of depth sensors to reduce costs drastically for such a telepresence system.

It is noted that, while the discussion to follow center on DOEs (and DOE segments) to produce the images in the image plane, the technical solution described above does not require DOEs. For example, in some implementations, the object that is illuminated to produce the images takes the form of a spatial light modulator (SLM). While some details of the design of SLMs over a large field might differ from those of DOEs, the general principles of the technical solution described above (i.e., breaking into small segments and illuminating each segment at a specified angle of incidence) remain the same.

FIG. 1 is a diagram that illustrates an example electronic environment 100 in which the above-described technical solution may be implemented. The computer 120 is configured to generate a plurality of DOE segments that best reproduce a given target image/.

The computer 120 includes a network interface 122, one or more processing units 124, and memory 126. The network interface 122 includes, for example, Ethernet adaptors, Token Ring adaptors, and the like, for converting electronic and/or optical signals received from the network 150 to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a target image manager 130, an image decomposition manager 140, an inverse imaging manager 150, and DOE arrangement manager 160. Further, as illustrated in FIG. 1, the memory 126 is configured to store various data, which is described with respect to the respective managers that use such data.

The target image manager 130 is configured to receive intensity data, i.e., target image data 132, representing a target image. In one example, such a target image may take the form of a human face in a facial recognition application. In another example, such a target image may take the form of a depth image of a person in a telepresence application. In some implementations, the target image manager 130 receives the target image data 132 over the network interface 122, i.e., over a network from a remote computer (not pictured). In some implementations, the target image manager 130 receives the target image data 132 from local storage (e.g., a disk drive, flash drive, SSD, or the like).

The target image data 132 represents the target image that is to be reproduced by a DOE to be determined. The target image data 132 includes intensity values (i.e., nonnegative values) over a spatial extent. In some implementations, the target image data 132 includes an array of such intensity values over a grid (e.g., pixels or voxels). In some implementations, the target image data 132 includes values indicative of a visibility with respect to a camera view (i.e., the target image is a depth image).

The image decomposition manager 140 is configured to perform an image decomposition operation on the target image data 132 to produce sub-image 142(1), . . . , 142(N). For example, assume that the target image has an extent of 2 m in the image plane, and the image plane is 2 m from an object to be imaged in an optical system. Assuming the distance between the object and exit pupil of the optical system may be neglected, the maximum ray angle that forms the image of the object in the image plane is 30 degrees. That is significantly larger than any angles in the region of validity of the simple, paraxial imaging models (e.g., Fresnel diffraction), used in computing the image of the object in the image plane. To alleviate this problem, the image decomposition manager divides the target image into sub-images with smaller extent. For example, if the target image in the above example is divided such that the largest sub-image has an extent of 10 cm, then the ray angles involved are less than about 1.4 degrees, well within the region of validity of paraxial image models.

Each of the sub-image data 142(1), . . . , 142(N), e.g., sub-image 142(1), includes a subset of the target image data 132. The subset of data in sub-image data 142(1) is chosen according to the position of the sub-image within the target image. Nevertheless, each subset of the target image data included in the sub-image data 142(1) represents a contiguous sub-image of the target image. In some implementations, the sub-image data 142(1) includes a sub-image identifier that indicates to which region of the target image the sub-image data 142(1) corresponds.

The inverse imaging manager 150 is configured to perform an inverse imaging operation on each of sub-image data 142(1) . . . , 142(N) to produce corresponding DOE segment data 152(1) . . . , 152(N). The inverse imaging operation includes a process by which a DOE segment is found that best approximates the corresponding sub-image. In some implementations, the inverse imaging operation includes Gerchberg-Saxton algorithm. In some implementations, the inverse imaging operation includes an iterative Fourier transform operation (IFTA). In some implementations, the inverse imaging operation includes an iterative algorithm that uses a different optical model such as Fresnel diffraction.

The DOE segment data 152(1) . . . 152(N), e.g., DOE segment data 152(1) represents the DOE segment corresponding to a sub-image (e.g., sub-image 142(1)) and determined via the inverse imaging operation (e.g., IFTA). In some implementations, the DOE segment data 152(1) includes an array of complex numbers. In some implementations, the DOE segment represented by DOE segment 152(1) is a phase-only DOE and the complex numbers have a unit magnitude or the same magnitude.

In some implementations, each value of the DOE segment data 152(1) represents the amplitude and/or phase of a respective pixel of a DOE segment. Accordingly, in such implementations the imaging models are discrete rather than continuous in nature. Moreover, when the DOE segments are manufactured (e.g., lithographically), the individual phases may correspond to heights of glass through which incident light passes and receives a phase difference from another pixel having a different glass height. In some implementations, however, the scattering at the boundaries between different glass heights may induce scattering within the DOE segment that the imaging model assumes is not present. In such implementations, the inverse imaging manager 150 may introduce amplitudes to each pixel to correct for such scattering effects.

The inverse imaging manager 150 may not be able to reproduce the exact sub-image data 142(1) upon imaging in a prescribed optical system. This is due to the discrete nature of the DOE as well as the physical approximations in the optical imaging model (e.g., paraxial model). Accordingly, in some implementations the inverse imaging operation 150 is iterative and repeats until a threshold error has been achieved. In some implementations, the threshold for convergence of the iterative process is based on a root mean square error across the sub-image. In some implementations, the threshold for convergence of the iterative process is based on a maximum absolute difference across the sub-image. In some implementations, the threshold is 5% or less.

It is also noted that, due to the small size of a pixel (e.g., 5 μm or less), diffraction effects at a pixel boundary, in some implementations, become significant. A consequence of such diffraction effects is to cause cross-talk in the image between pixels and even between images of neighboring DOE segments. Accordingly, in some implementations, the inverse imaging manager 150 is configured to perform a diffraction-corrective operation to account for such cross-talk in the DOE segments. In some implementations, the diffraction-corrective operation uses the GS algorithm for pixels at the DOE segment boundaries.

The DOE arrangement manager 160 is configured to arrange the DOE segment data 152(1) . . . , 152(N) in such a way as to produce DOE data 162 representing a full DOE that, in the aggregate, produces an approximation of the target image upon illumination in an optical system. An example optical system that produces such an approximation to the target image is discussed in further detail with respect to FIGS. 3A, 3B, 4, 5A, and 5B.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, a target image manager 130 (and/or a portion thereof), an image decomposition manager 140, an inverse imaging manager 150, and a DOE arrangement manager 160 can be a combination of a processor and a memory configured to execute instructions related to a process to implement one or more functions.

Figure 2:
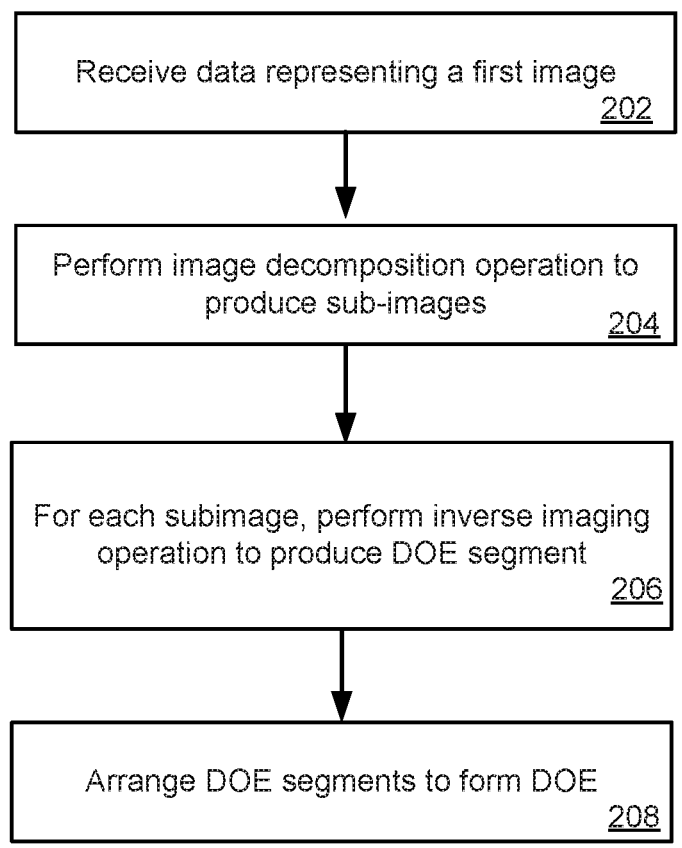
FIG. 2 is a flow chart that illustrates an example method of implementing the improved techniques as shown in FIG. 1.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the VR server computer 120. As illustrated in FIG. 2, the memory 126 is configured to store various data, including target image data 130, sub-image data 142(1) . . . 142(N), DOE segment data 152(1) . . . 152(N), and DOE data 162.

FIG. 2 is a flow chart depicting an example method 200 of resolving conflicts within a virtual environment. The method 200 may be performed by software constructs described in connection with FIG. 1, which reside in memory 126 of the computer 120 and are run by the set of processing units 124.

At 202, the target image manager 130 receives intensity data (e.g., target image data 132) representing a first image (i.e., the target image).

At 204, the image decomposition manager 140 performs an image decomposition operation to produce a plurality of sub-images of the first image (e.g., sub-image data 142(10), . . . , 142(N)), each of the plurality of sub-images representing a portion of the image. That is, as discussed above, each of the sub-image data represents a portion of the target image over a contiguous region of the sub-image represented by the sub-image data.

At 206, the inverse imaging manager 150, for each of the plurality of sub-images of the image, performing an inverse imaging operation on that sub-image to produce a DOE segment of a plurality of DOE segments (e.g., DOE segment data 152(1) . . . , 152(N)), each of the plurality of DOE segments corresponding to a respective sub-image of the plurality of sub-images.

At 208, the DOE arrangement manager 160 arranges the plurality of DOE segments based on the image decomposition operation to form a DOE (e.g., DOE data 162). In some implementations, there is no need to form a formal, aggregated DOE as the imaging is performed on the DOE segments. Nevertheless, the DOE segments are arranged by the DOE arrangement manager so that, upon illumination, the DOE segments in aggregate produce an approximation to the target image.

Figure 3A:
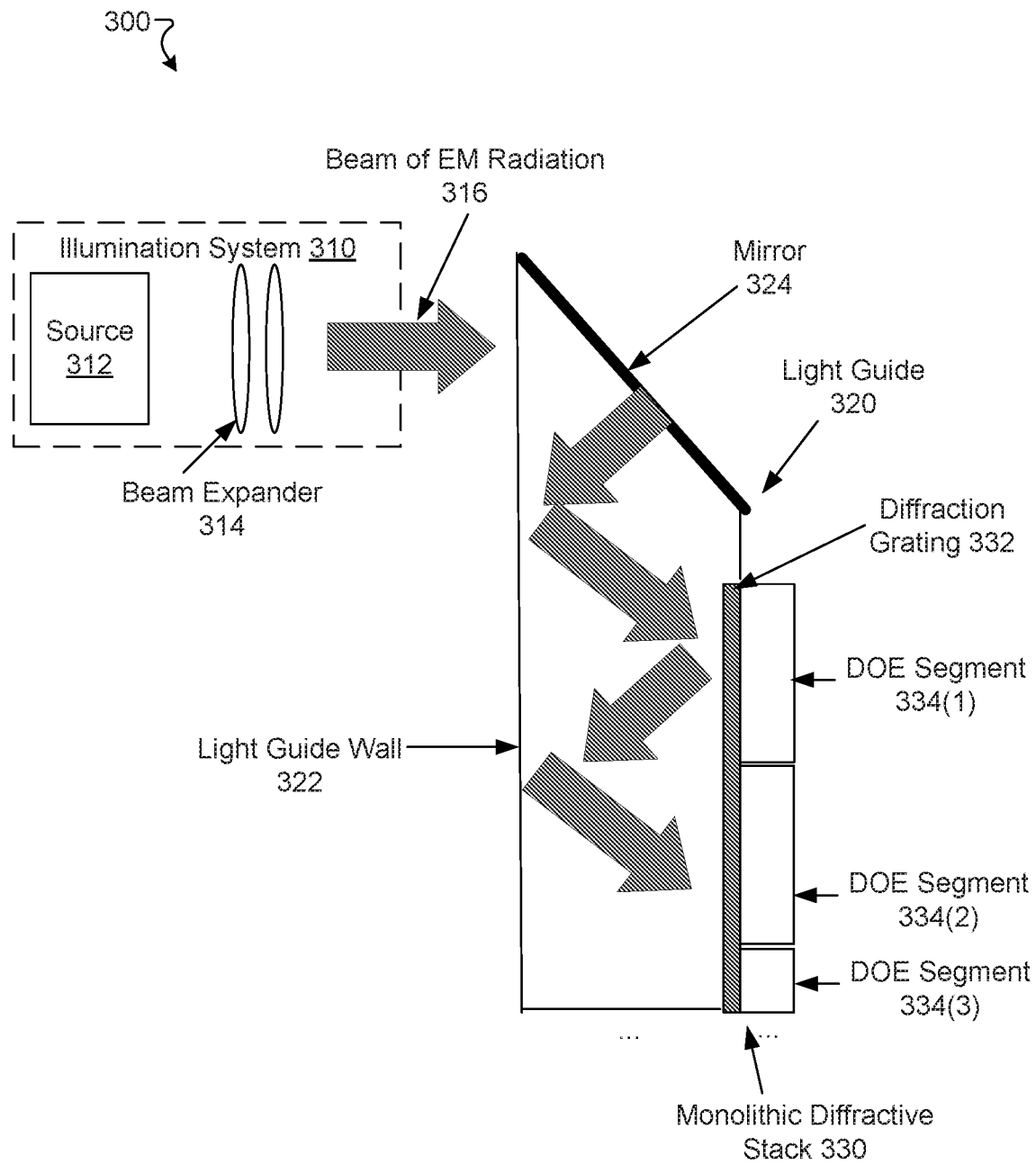
FIG. 3A is a diagram of an example light guide with a mirror coupler according to the improved techniques shown in FIG. 1.

FIG. 3 is a diagram illustrating an example optical system 300 configured to form an approximation of the target image. The optical system 300 as shown in FIG. 3A includes an illumination system 310, a light guide 320, and a monolithic diffractive stack 330.

The illumination system 310 is configured to generate the illumination that is incident on each of the DOE segments via the light guide 320. The illumination system 310 includes an illumination source 312 and a beam expander 314.

The illumination source 312 is configured to produce a stable beam of electromagnetic radiation for input into the beam expander 314. In some implementations, the illumination source 312 is a laser. In some implementations, the illumination source 312 is a mercury arc lamp. In some implementations, the illumination source 312 outputs electromagnetic radiation in the infrared part of the electromagnetic spectrum (e.g., 800 nm-2000 nm).

The beam expander 314 is configured to produce a beam 316 having a larger width than that produced by the illumination source 312. As shown in FIG. 3A, the beam expander 314 includes a diverging lens and collimating lens. Other beam expanders (e.g., a convergent lens and a collimation lens placed beyond the focus of the convergent lens) are possible in come implementations.

The light guide 320 is configured to capture the beam 316 output from the illumination system 310 and from that beam produce incident illumination on each of the DOE segments. The light guide 320, as shown in FIG. 3A, couples the light 316 output from the illumination system 310 using a mirror 324. The mirror is angled so that the light reflects off the wall 322 of the light guide at locations where the beam 316 may then be directed to each DOE segment at normal incidence (or any specified angle of incidence). The light guide 320 may be constructed so that the captured beam 316 propagates through the light guide 320 via total internal reflection. Further details regarding how the light propagates through the light guide 320 are discussed with regard to FIGS. 5A and 5B.

The monolithic diffractive stack 330 is configured to form the respective sub-image approximations that, in aggregate, form an approximation to the target image. As shown in FIG. 3A, the monolithic diffractive stack 330 includes a diffraction grating 332 and DOE segments 334(1) . . . , 334(3). (NB there may be more DOE segments.)

The diffraction grating 332 is configured to direct light incident on the monolithic diffractive stack 330 into a normal incidence on the DOE segments. In some implementations, the diffraction grating is embedded in a wall of the light guide 320. In some implementations and as shown in FIG. 3A, the DOE segments 334(1) . . . , 334(3) are disposed on top of the diffraction grating 332. In some implementations, the diffraction grating is disposed on a wall opposite the DOE segments 334(1) . . . , 334(3). In some implementations, the diffraction grating 332 is segmented such that each segment corresponds to a DOE segment 334(1) . . . , 334(3).

The DOE segments 334(1) . . . , 334(3) are configured to produce images that approximate the sub-images obtained from the image decomposition operation. These segments are, in some implementations, disposed onto the diffraction grating 332 to form the monolithic diffractive stack. In some implementations, the DOE segments 334(1) . . . , 334(3) are attached to or embedded in a wall of the light guide 320; in this case the monolithic diffractive stack has an air interface between the diffraction grating 332 and the DOE segments 334(1) . . . , 334(3).

Figure 3B:
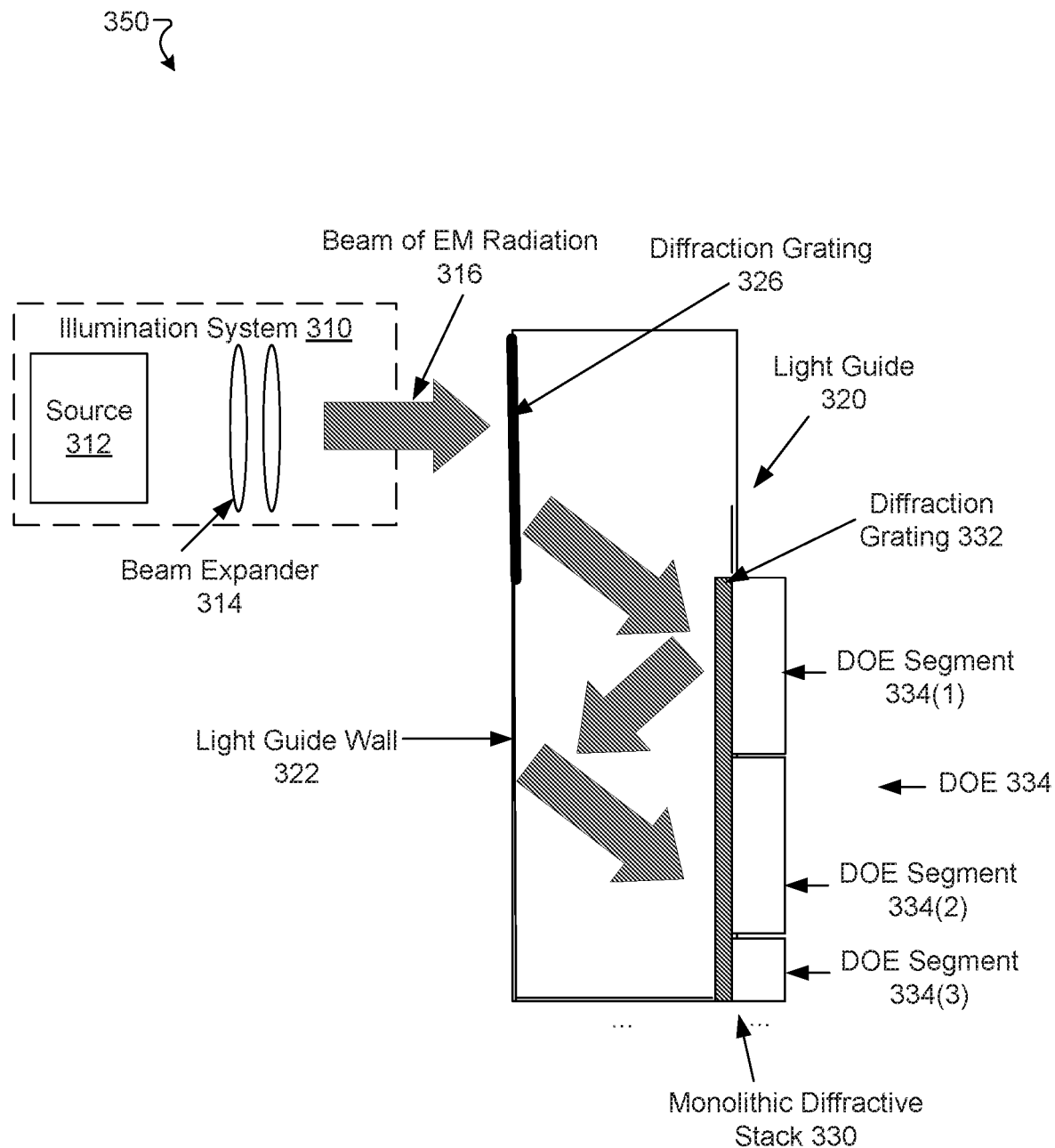
FIG. 3B is a diagram of an example light guide with a diffraction grating coupler according to the improved techniques shown in FIG. 1.

FIG. 3B is a diagram illustrating another example optical system 350 configured to form an approximation to the target image. In the optical system 350, the light guide 320 couples the beam 316 using a diffraction grating 326 rather than a mirror. The diffraction grating is then ruled (e.g., has a pitch) such that its strongest propagating order is directed to propagate in the light guide 320 via total internal reflection and produce normally incident illumination on each of the DOE segments 334(11), . . . .

Figure 4:
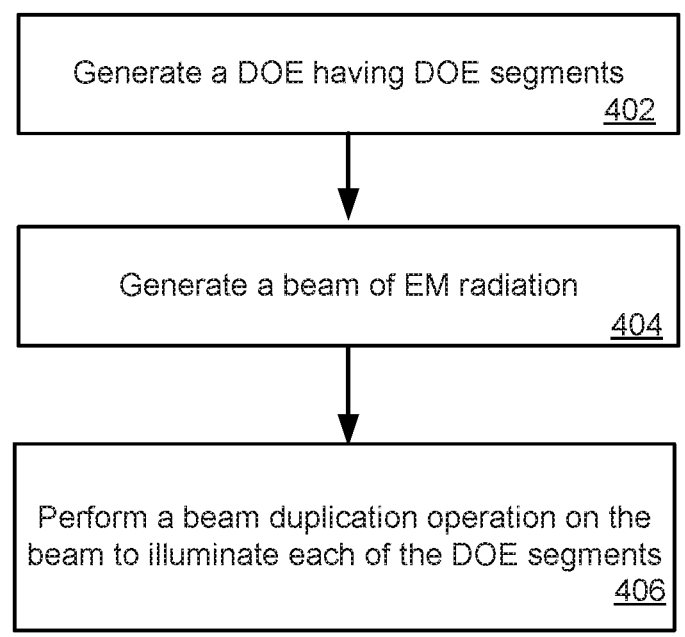
FIG. 4 is a flow chart that illustrates an example method of implementing the improved techniques shown in FIGS. 3A and/or 3B.

FIG. 4 is a flow chart depicting an example method 400 of forming an approximation to a target image.

At 402, a diffractive optical element (DOE) is generated based on a first image (i.e., the target image), the DOE including a plurality of DOE segments (e.g., DOE segments 334(1), . . . ), each of the plurality of DOE segments corresponding to a respective portion of the first image. Note that the generation may be performed as described in FIG. 2.

At 404, a beam of electromagnetic radiation (e.g., beam 316) is generated by an illumination system (e.g., illumination system 310).

At 406, a beam duplication operation is performed on the beam of electromagnetic radiation to illuminate each of the plurality of DOE segments with the beam of electromagnetic radiation, the plurality of DOE segments forming the DOE and producing upon illumination a second image, a difference between the first image and the second image being less than a specified threshold. The beam duplication operation is performed, in some implementations, by the light guide 320 as shown in FIGS. 3A and 3B.

Figure 5A:
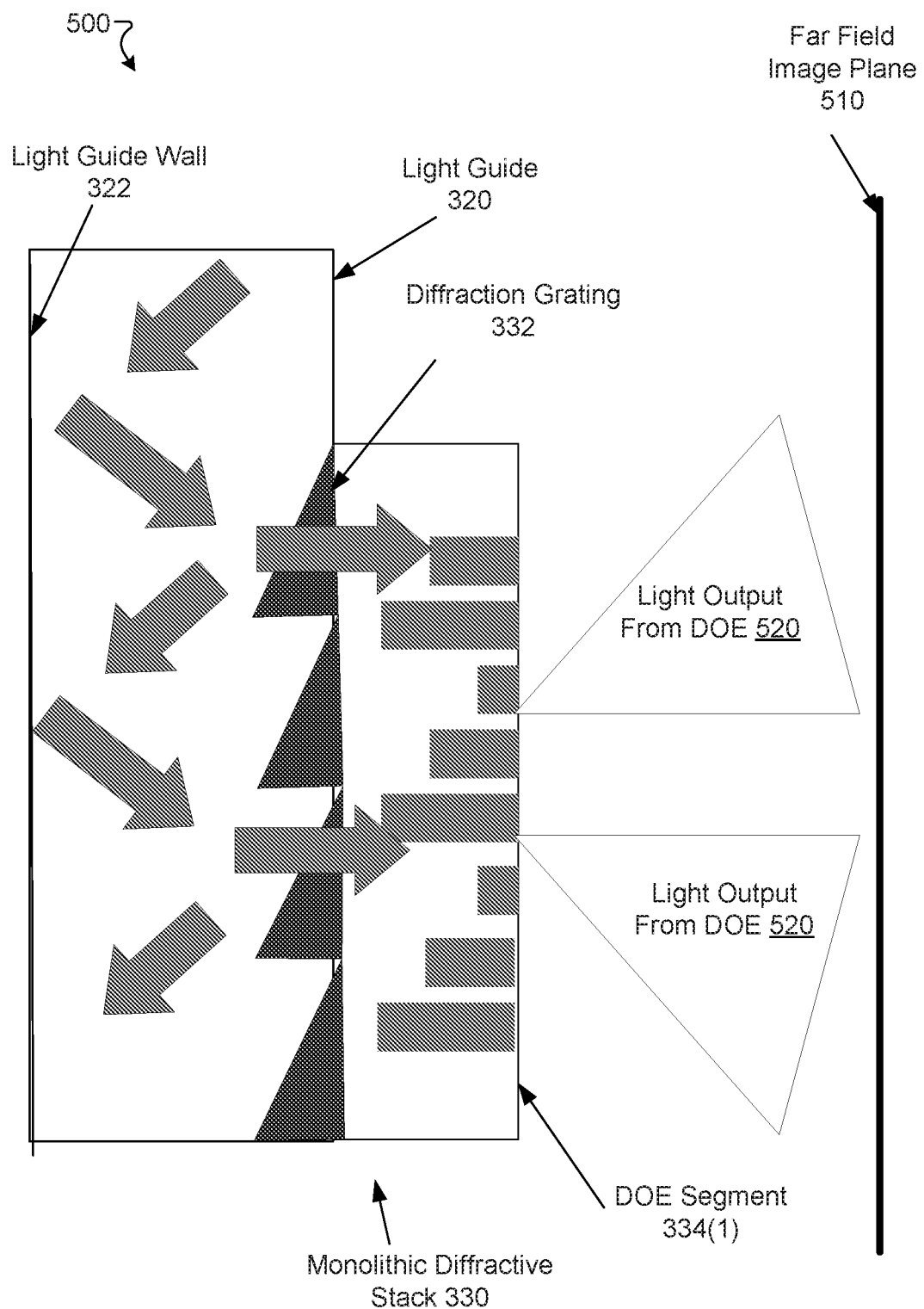
FIG. 5A is a diagram of an example light guide with a blazed diffraction grating embedded in a wall of the light guide and onto which a DOE segment is disposed.

FIG. 5A is a diagram of an example optical system 500 including a light guide 320 and monolithic diffractive stack 330 used to produce an approximation to the target image. As shown in FIG. 5A, the monolithic diffractive stack 330 includes a blazed diffraction grating 332 and DOE segment 334(1). The purpose of the blazed diffraction grating 332 is to redirect oblique illumination into normal incidence on the DOE segment 334(1). The blazed diffraction grating 332 accordingly has angled features with the angle configured to produce the normal incidence based on the angle at which the total internal reflection occurs in the light guide 320. Further, as shown in FIG. 5A, the blazed diffraction grating 332 is etched into a wall of the light guide 320 and the DOE segment 334(1) is disposed on the backside of the diffraction grating 332.

Upon illumination by the illumination system 310 (FIGS. 3A and 3B), the normally incident light on the DOE segment 334(1) produces light 520 forming an image that is an approximation to a sub-image of the target image in the target (far-field) image plane 510. The approximation is at most within some threshold (e.g., 5%, 2%, 1% or less) of difference from the sub-image of the target image in the image plane; this is a result of the inverse image operation. In some implementations, the difference is defined as a root mean square difference across the sub-image. In some implementations, the difference is a maximum absolute difference across the sub-image.

In some implementations, the diffraction grating 332 has a two-dimensional structure. In this way, the monolithic diffractive stack 330 causes the radiation to propagate and interact in two orthogonal directions. The interactions in both orthogonal directions may further enhance the composite field-of-view of the image pattern in the image plane 510.

Figure 5B:
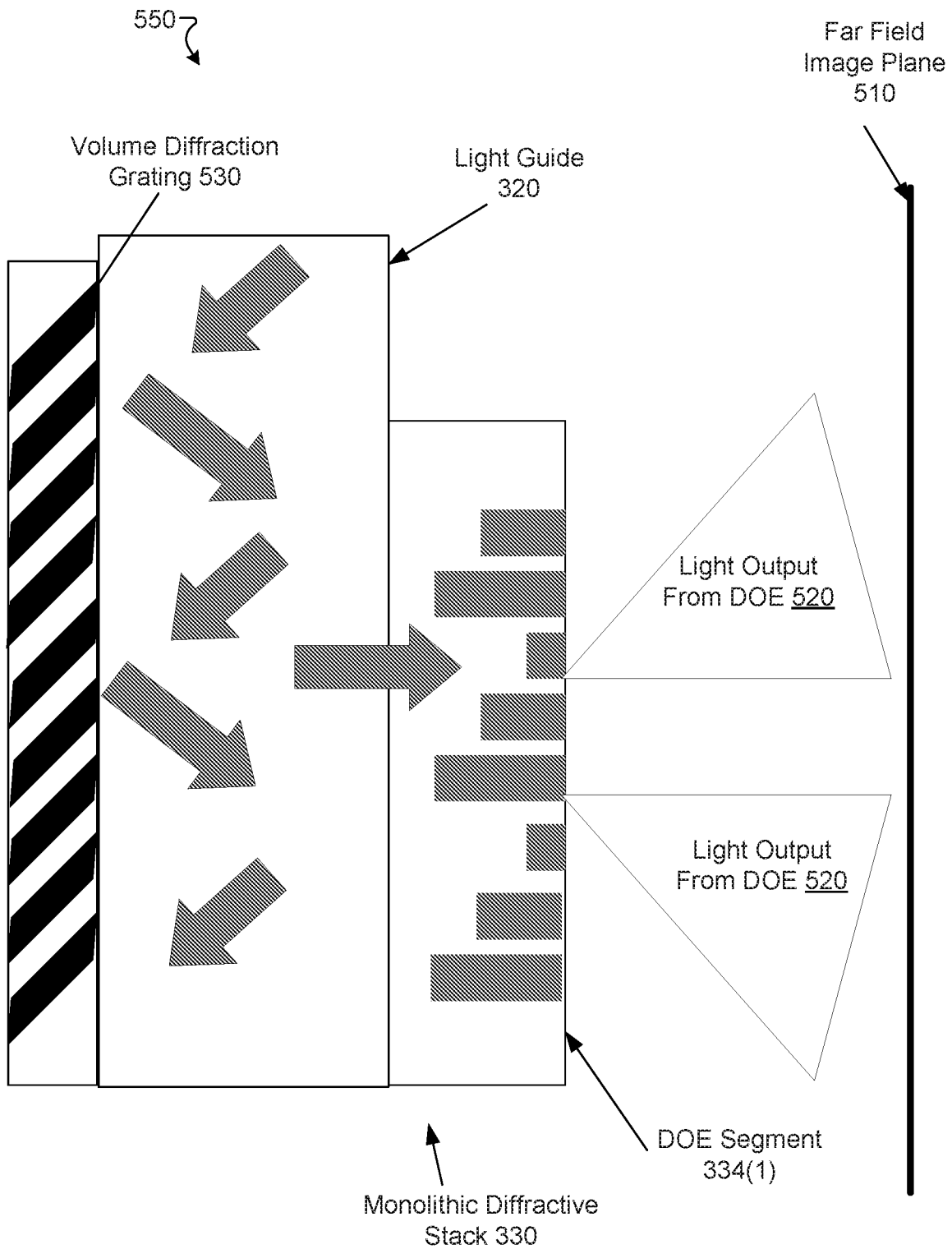
FIG. 5B is a diagram of an example light guide with a volumetric diffraction grating embedded in a wall of the light guide.

FIG. 5B is a diagram of an example optical system 550 including a light guide 320 with a DOE segment 334(1) disposed on a wall of the light guide 320 and a volumetric diffraction grating 530 etched into an opposite wall of the light guide 320. The volumetric diffraction grating 530 produces, from an incident beam of light, a reflected beam and a diffracted beam that is normally incident on the DOE segment 334(1). In some implementations, the volumetric diffraction grating 520 duplicates the light beam 316 in orthogonal directions in the light guide; in this way, a full 2D image may be reproduced in the image plane 510.

Figure 6:
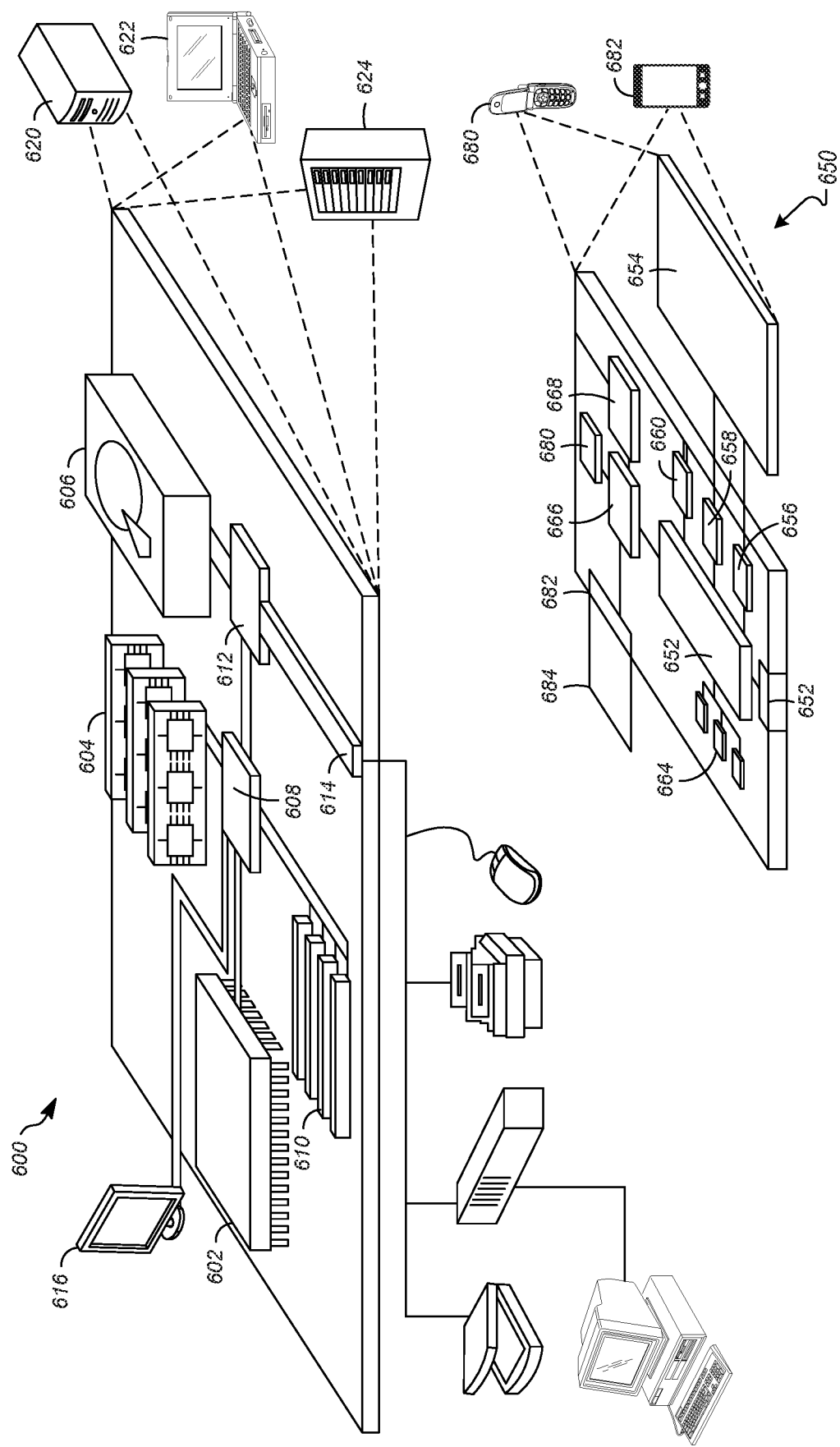
FIG. 6 illustrates an example of a computer device and a mobile computer device that can be used with circuits described here.

FIG. 6 illustrates an example of a generic computer device 600 and a generic mobile computer device 650, which may be used with the techniques described here.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650 or may also store applications or other information for device 650. Specifically, expansion memory 674 may include instructions to carry out or supplement the processes described above and may include secure information also. Thus, for example, expansion memory 674 may be provided as a security module for device 650 and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    generating a wavefront modulating element (WME) based on a first image, the WME including a plurality of WME segments, each of the plurality of WME segments corresponding to a respective portion of the first image;
    generating, by an illumination system, a beam of electromagnetic radiation; and
    illuminating each of the plurality of WME segments with the beam of electromagnetic radiation at a specified angle of incidence, each of the plurality of WME segments being disposed upon a respective diffraction grating to produce a respective monolithic diffractive stack for that WME segment, the plurality of WME segments producing upon illumination a second image, a difference between the first image and the second image being less than a specified threshold.

2. The method as in claim 1, wherein illuminating each of the plurality of WME segments includes coupling the beam of electromagnetic radiation into a light guide, the light guide including walls to which the WME is connected.

3. The method as in claim 2, wherein the respective monolithic diffractive stack for each of the plurality of WME segments is configured to produce an approximation to the respective portion of the first image to which that WME segment corresponds, the respective monolithic diffractive stack for each of the plurality of WME segments being disposed on a wall of the light guide.

4. The method as in claim 3, wherein the light guide includes walls, and
    wherein illuminating each of the plurality of WME segments includes:
        propagating the beam of electromagnetic radiation through the light guide via total internal reflection off the walls of the light guide; and collecting stray light reflected by the respective monolithic diffractive stack back into the light guide to produce illumination having substantially the same brightness when incident on each of the plurality of WME segments of the WME.

5. The method as in claim 2, wherein generating the beam of electromagnetic radiation includes expanding and homogenizing the beam using a beam expander prior to the coupling of the beam of electromagnetic radiation into the light guide.

6. The method as in claim 1, wherein generating the WME based on the first image includes:
receiving intensity data representing the first image;
performing an image decomposition operation to produce a plurality of sub-images of the first image, each of the plurality of sub-images representing a portion of the first image; and
for each of the plurality of sub-images of the first image, performing an inverse imaging operation on that sub-image to produce a representation of a respective WME segment of a plurality of representations of WME segments.

7. The method as in claim 6, wherein performing the inverse imaging operation on each of the plurality of sub-images of the first image includes:
applying a Gerchberg-Saxton algorithm to each of the plurality of sub-images.

8. The method as in claim 6, wherein the WME includes a diffractive optical element (DOE) and each of the plurality of WME segments includes a respective DOE segment of the DOE, and
wherein each representation of a DOE segment of the plurality of WME segments includes a respective plurality of pixels, each of the respective plurality of pixels having one of a specified number of phase values.

9. The method as in claim 8, wherein each of the respective plurality of pixels further includes an intensity value.

10. The method as in claim 6, wherein generating the WME based on the first image further includes:
arranging the plurality of WME segments based on the image decomposition operation to form the WME.

11. A system, comprising:
a DOE generation system including controlling circuitry configured to generate a diffractive optical element (DOE) based on a first image, the DOE including a plurality of DOE segments, each of the plurality of DOE segments corresponding with a respective portion of the first image;
an illumination system configured to generate a beam of electromagnetic radiation; and
an imaging system configured to produce a second image upon illumination with the beam of electromagnetic radiation by illuminating each of the plurality of DOE segments with the beam of electromagnetic radiation, each of the plurality of DOE segments being disposed upon a respective diffraction grating to produce a respective monolithic diffractive stack for that DOE segment, the plurality of DOE segments forming the DOE and producing upon illumination a second image, a difference between the first image and the second image being less than a specified threshold.

12. The system as in claim 11, wherein the imaging system configured to illuminate each of the plurality of DOE segments is further configured to couple the beam of electromagnetic radiation into a light guide, the light guide including walls to which the DOE is connected.

13. The system as in claim 12, wherein the respective monolithic diffractive stack for each of the plurality of DOE segments is configured to produce an approximation to the respective portion of the first image to which that DOE segment corresponds, the respective monolithic diffractive stack for each of the plurality of DOE segments being disposed on a wall of the light guide.

14. The system as in claim 11, wherein the respective diffraction grating has a pitch based on a maximum length of a segment of the DOE.

15. The system as in claim 13, wherein the respective diffraction grating is configured to reflect illumination back into the light guide, the illumination propagating in the light guide in at least two orthogonal directions.

16. The system as in claim 12, wherein light guide includes a mirror surface to couple the beam of electromagnetic radiation into the light guide.

17. The system as in claim 12, wherein light guide includes a diffraction grating to couple the beam of electromagnetic radiation into the light guide.

18. A computer program product comprising a non-transitory storage medium, the computer program product including code that, when executed by processing circuitry of a computing device, causes the processing circuitry to perform a method, the method comprising:
receiving intensity data representing an image;
performing an image decomposition operation to produce a plurality of sub-images of the image, each of the plurality of sub-images representing a portion of the image;
for each of the plurality of sub-images of the image, performing an inverse imaging operation on that sub-image to produce a wavefront modulating element (WME) segment of a plurality of WME segments, each of the plurality of WME segments corresponding to a respective sub-image of the plurality of sub-images; and
arranging the plurality of WME segments based on the image decomposition operation to form a WME such that each of the plurality of WME segments is disposed upon a respective diffraction grating to produce a respective monolithic diffractive stack for that WME segment.

19. The computer program product as in claim 18, wherein performing the inverse imaging operation on each of the plurality of sub-images of the image includes:
applying a Gerchberg-Saxton algorithm to each of the plurality of sub-images.

20. The computer program product as in claim 18, wherein each representation of a WME segment of the plurality of WME segments includes a respective plurality of pixels, each of the respective plurality of pixels having one of a specified number of phase values.

* * * * *